United States Patent [19]

Bresenham et al.

[11] Patent Number: 4,633,243

[45] Date of Patent: Dec. 30, 1986

[54] METHOD OF STORING CHARACTERS IN A DISPLAY SYSTEM

[75] Inventors: Jack E. Bresenham, Winchester; Ronald J. Bowater, Romsey; Adrian C. Gay, Fareham; Norman R. Sheen, Winchester, all of United Kingdom

[73] Assignee: International Business Machines Corporation, Armonk, N.Y.

[21] Appl. No.: 592,675

[22] Filed: Mar. 23, 1984

[30] Foreign Application Priority Data

Jun. 30, 1983 [EP] European Pat. Off. ........ 83303790.6

[51] Int. Cl.⁴ ........................ G06F 3/153; G06F 3/14; G09G 1/10

[52] U.S. Cl. .................................... 340/732; 340/739; 340/740; 340/727; 340/748

[58] Field of Search ............... 340/732, 739, 740, 748, 340/731, 727, 741, 742; 315/365, 356

[56] References Cited

U.S. PATENT DOCUMENTS

| | | | |
|---|---|---|---|
| 3,569,951 | 3/1971 | Lavenir | 340/740 |
| 3,597,757 | 8/1971 | Vincent-Carrefour | 340/740 |
| 3,938,130 | 2/1976 | Burnham et al. | 340/740 |
| 4,228,510 | 10/1980 | Johnson et al. | 340/739 |
| 4,507,656 | 3/1985 | Morey et al. | 340/727 |
| 4,529,978 | 7/1985 | Rupp | 340/727 |

*Primary Examiner*—Marshall M. Curtis
*Assistant Examiner*—Donna Angotti
*Attorney, Agent, or Firm*—George E. Clark; Edwin Lester

[57] ABSTRACT

In a method of storing characters in a display system having a display device with an orthogonal matrix of addressable points, each character is represented as a succession of strokes each constrained to lie in one of the eight fundamental directions of the matrix and, except for the first stroke, each starting at the end of the previous stroke. Each such stroke is stored in a binary coded form which includes a first binary number (direction code) defining the angular direction of the stroke, a second binary number (length code) defining a number of matrix steps from one addressable point to the next along the stroke in that direction, and a third binary number (move/draw code) defining the visibility of the stroke. In order to facilitate character rotation by any multiple of 45° the direction code defining each fundamental direction corresponds to the addition modulo $2^n$ of a binary constant to the direction code which defines the fundamental direction of 45° thereto in a given direction of rotation, where n is the number of bits in the direction code.

2 Claims, 9 Drawing Figures

| CODES | | | | | | | | |
|---|---|---|---|---|---|---|---|---|
| D/M | DIRECTION | | | LENGTH | | | | |
| 0 | 0 | 1 | 0 | 1 | 1 | 0 | 0 | |
| 0 | 0 | 0 | 1 | 0 | 1 | 1 | 0 | |
| 0 | 1 | 1 | 1 | 0 | 1 | 1 | 0 | |
| 0 | 1 | 1 | 0 | 1 | 1 | 0 | 0 | |
| 1 | 1 | 0 | 0 | 1 | 0 | 1 | 1 | |
| 1 | 0 | 1 | 0 | 0 | 1 | 1 | 0 | |
| 0 | 0 | 0 | 0 | 1 | 0 | 1 | 0 | |
| 1 | 1 | 1 | 0 | 0 | 1 | 1 | 0 | (i) |
| 1 | 0 | 0 | 0 | 0 | 0 | 1 | 1 | (i) |
| 0 | 0 | 0 | 0 | 0 | 0 | 0 | 0 | (ii) |

| CODES | | | | | | | |
|---|---|---|---|---|---|---|---|
| D/M | DIRECTION | | | LENGTH | | | |
| 0 | 0 | 1 | 0 | 1 | 1 | 0 | 0 |
| 0 | 0 | 0 | 1 | 0 | 1 | 1 | 0 |
| 0 | 1 | 1 | 1 | 0 | 1 | 1 | 0 |
| 0 | 1 | 1 | 0 | 1 | 1 | 0 | 1 |
| 1 | 1 | 0 | 0 | 1 | 0 | 1 | 1 |
| 1 | 0 | 1 | 0 | 0 | 1 | 1 | 1 |
| 0 | 0 | 0 | 0 | 1 | 0 | 1 | 1 |
| 1 | 1 | 1 | 0 | 0 | 1 | 1 | 0 (i) |
| 1 | 0 | 0 | 0 | 0 | 0 | 1 | 0 (i) |
| 0 | 0 | 0 | 0 | 0 | 0 | 0 | 0 (ii) |

METHOD OF STORING CHARACTERS IN A DISPLAY SYSTEM

FIELD OF THE INVENTION

This invention relates to a method of storing characters in a display system having a display device with an orthogonal matrix of addressable points.

The invention is particularly, but not exclusively, applicable to the storage of characters in systems having a raster display device such as a gas panel or raster scan CRT, in which case the matrix of addressable points corresponds to the discrete addressable pel positions of the display device. However, this method may also be used in systems having a digitally-controlled vector (calligraphic) display device such as a plotter or random scan CRT, in which case the matrix of addressable points corresponds to the addressable points on the display surface.

BACKGROUND OF THE INVENTION

At present, the most common technique for defining an alphanumeric and symbol character set in a raster display system is to define each character is a read-rastered dot matrix format which explicitly defines the ON and OFF pels for the character and maps one-to-one to the display surface (such as a CRT screen) in the region of the surface where the character is to be positioned; see, for example, page 115 of the book "Fundamentals of Interactive Computer Graphics" by Foley and Van Dam, published 1982 by the Addison-Wesley Publishing Company. The advantage of characters defined in dot matrix format is that they do not require vector-to-raster conversion and are therefore speedily made available to the display device when specified for display. However, the dot matrix format is highly inefficient as regards storage space since each bit of the matrix is stored irrespective of whether this represents a visible part of the character (e.g., an ON pel for a light on dark image) or a part of the background (an OFF pel). For example, for characters defined in a 14 by 20 matrix, at least 280 bits are required to define each character regardless of the complexity of the character.

It is therefore an object of the present invention to provide an improved method of storing characters which is more economical of storage space than the prior art referred to above, but which does not achieve this at the expense of greatly increased processing complexity when the characters are specified for display.

SUMMARY OF THE INVENTION

This object is achieved according to the present invention by representing each character as a succession of strokes each constrained to lie in one of the eight fundamental directions of the matrix and, except for the first stroke, each starting at the end of the previous stroke, and by storing each such stroke in a binary coded form which includes a first binary number (direction code) defining the angular direction of the stroke, a second binary number (length code) defining a number of matrix steps from one point to the next in that direction, and a third binary number (move/draw code) defining the visibility of the stroke.

It is to be understood that the eight fundamental directions referred to above are the positive and negative directions of the X and Y axes of the matrix and the positive and negative directions of the two diagonals which bisect these axes. Alternatively, they may be considered as the directions of the eight possible moves from one matrix point to any immediately adjacent matrix point, axially or diagonally.

The advantage of the invention is that substantially less data is required to define each character than by the dot matrix technique, since the amount of data will be proportional to the number of strokes representing the character. In general, a conventional character set can be stored using only about 25% of the storage space needed for the dot matrix format. Despite this, however, the need for complex incremental vector-to-raster conversion algorithms for the characters stored in the manner according to the invention is avoided by constraining the strokes of each character to lie along one of the eight fundamental 45° directions of the matrix. As is well known, lines lying along these particular directions constitute special cases which can be rapidly "drawn" without the need for such algorithms.

Another advantage is that for characters stored in the above manner only those pels which form a visible part of the character (e.g., the ON pels for a light on dark display) have to be addressed and written to the display device or, in the case of a refresh raster display device such as a conventional CRT, to the raster bit planes (refresh buffer). Thus, the performance of writing characters is enhanced. Furthermore, proportional spacing of characters can be readily achieved by including in each character definition one or more final non-visible strokes to position the starting point of the first stroke of the next character.

A further disadvantage of the dot matrix technique of character definition is that it is not easy to provide the characters rotated on the display surface relative to the orientation defined by the dot matrix. While such a limitation may be acceptable for predominantly alphanumeric displays, it is often undesirable for mixed displays with a high graphical content where drawing legends may be required at angles other than the horizontal.

Therefore in the preferred embodiment of the invention, the direction code defining each fundamental direction corresponds to the addition modulo $2^n$ of a binary constant m to the direction code which defines the fundamental direction at 90° thereto in a given direction of rotation, where n is the number of bits in each direction code.

The advantage of this arrangement is that rotation through any multiple of 90° is readily achieved simply by adding a character rotation factor (i.e., a common rotational constant equal to m or an integral multiple thereof) to the direction code of every stroke of a character and taking the least significant n bits of the result. Scaling is also readily achieved by multiplying or dividing the length code of every stroke of a character by a common scaling constant.

More particularly, the direction code defining each fundamental direction corresponds to the addition modulo $2^n$ of m/2 to the direction code which defines the fundamental direction at 45° thereto in the given direction of rotation.

This further permits rotation through any multiple of 45° by adding a character rotation factor of m/2 or an integral multiple thereof to the direction code of every stroke of a character and taking the least significant n bits of the result. It is to be noted, however, that rotation through 45° or an odd multiple thereof will in general produce distortion of the display characters, since after such rotational axial strokes will become diagonal strokes with their actual (displayed) length increased by a factor of $\sqrt{2}$, and diagonal strokes will become axial strokes with their actual length decreased by a factor of $1/\sqrt{2}$. This distortion may be reduced to some extent by careful design of the characters, but it may be fully compensated in the preferred embodiment by doubling the number of steps defined by the length code in respect of all diagonal strokes in the initial character definition, i.e., before rotation.

It is to be understood that the terms "first", "second" and "third" as applied to the binary numbers defining each character are not intended to imply any particular order or priority among these numbers, but are merely convenient labels used to distinguish between them for the purposes of the present specification. In the preferred embodiment, the first binary number (direction code) consists of three bits (000, 001, 010 . . . to 111 respectivly corresponding to the angles 0°, 45°, 90° . . . to 315°), the second binary number (length code) consists of four bits which can define strokes up to 15 matrix steps long and which we have found to be adequate for providing characters of reasonable resolution, and the third binary number (move/draw code) consists of a single bit whose value determines whether the stroke is a "move" or "draw" (i.e., whether the stroke is visible or not with respect to the background).

It is to be noted that in the preferred embodiment each successive direction code corresponds to the addition modulo 8 of a "1" to the immediately preceding direction code (i.e., m=1). While the use of a three bit code for defining direction, with successive numbers differing by "1", is of course the most simple implementation, many other sequences exist. The following is an arbitrary example:

0°: 0101
45°: 1011
90°: 0001
135°: 0111
180°: 1101
225°: 0011
270°: 1001
315°: 1111

In this example each successive 45° direction has a four bit code (n=4) which is derived from the preceding code by the addition modulo 16 of m=0110 (decimal 6). In this case, rotation through any desired multiple of 45° is achieved by the addition of 0110 or an integral multiple thereof to the direction code of every character and then taking the least significant four bits of the result.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

In the present embodiment, characters are represented by a succession of "nose-to-tail" strokes each constrained to lie in one of the eight fundamental directions of the orthogonal matrix of addressable pel positions of a raster display device, and each stroke is coded in one byte of binary information with a one bit draw/-move code, a three bit direction code, and a four bit length code. The direction codes are as follows:

| ANGLE | DIRECTION CODE |
|---|---|
| 0° | 000 |
| 45° | 001 |
| 90° | 010 |
| 135° | 011 |
| 180° | 100 |
| 225° | 101 |
| 270° | 110 |
| 315° | 111 |

The draw/move code is one bit:

0=draw (display

1=move (non-display)

and the length code is four bits giving a maximum length of 15 matrix steps in the stroke direction. For strokes which exceed this length, multiple bytes with the same direction code can be used. A length code of zero (0000) is used to terminate the character definition.

Figures 1, 2:
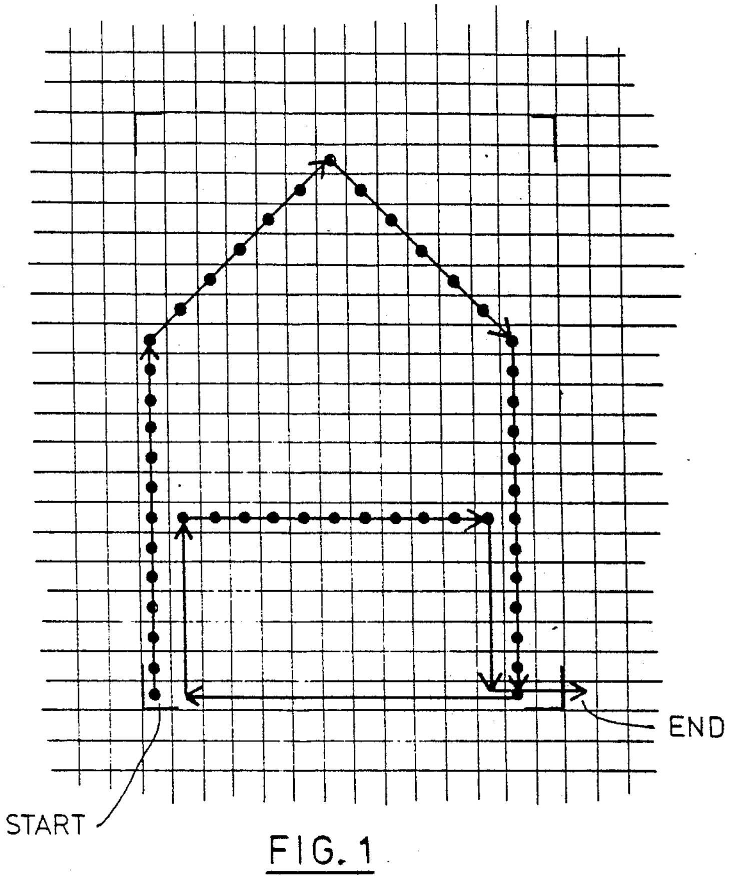
FIG. 1 is a schematic diagram of a capital "A" as it might appear on a raster display device.
FIG. 2 is a table showing how the "A" of FIG. 1 is coded according to the embodiment of the invention.

FIG. 1 is a schematic diagram of a capital "A" as it might appear on a raster display device, each small square in the diagram representing one addressable pel position of the device and each dot representing one active pel (i.e., a pel distinguished from the background). FIG. 2 is a table illustrating how the above character could be coded according to the coding method described above.

The character is assumed to lie within a 14 by 20 character box (indicated in bold lines at its four corners), and it will be seen that the character is represented by a succession of move and draw strokes indicated by the arrows which trace round the character beginning at the lower left pel position which is the start position for the character. For the first character in a string of characters the actual physical location of the start position on the display device is defined by a "DRAW CHARACTERS" command as will be described, the location of the start position of each succeeding character in the string thereafter being defined by the end position of the preceding character. Thus, the two bytes labelled (i) in FIG. 2 are positioning moves which bring the end of the character to the start position (lower left pel position) of the next character box. Clearly, the width of the character boxes need not be the same for all characters and therefore, proportional spacing is readily achieved. The final all zero byte (ii) is the character definition terminator.

It will be observed that 280 (14×20) bits of storage would be needed if the capital "A" were defined in conventional dot matrix format, whereas the present method uses only 80 bits. It will be appreciated that the particular path chosen in FIG. 1 to trace around the character is but one of several that could be chosen. Any path consisting of strokes confined to the eight fundamental directions and which includes all the visible pel positions can be used, although naturally that providing the least number of strokes will normally be chosen.

Rotation of the character through 90° or any multiple thereof may be readily achieved by the addition modulo 8 of a common character rotation factor of 010 or a corresponding multiple thereof to the direction code of each stroke, prior to decoding and drawing the character. The character rotation factors to be added are as follows:

| DESIRED ROTATION | CHAR. ROTN. FACTOR |
|---|---|
| 90° | 010 |
| 180° | 100 |
| 270° | 110 |

More particularly, rotation through 45° or any multiple thereof may be effected by the addition modulo 8 of a common character rotation factor of 001 or a corresponding multiple thereof to the direction code of each stroke:

| DESIRED ROTATION | CHAR. ROTN. FACTOR |
|---|---|
| 45° | 001 |
| 90° | 010 |
| 135° | 011 |
| 180° | 100 |
| 225° | 101 |
| 270° | 110 |
| 315° | 111 |

Figure 3:
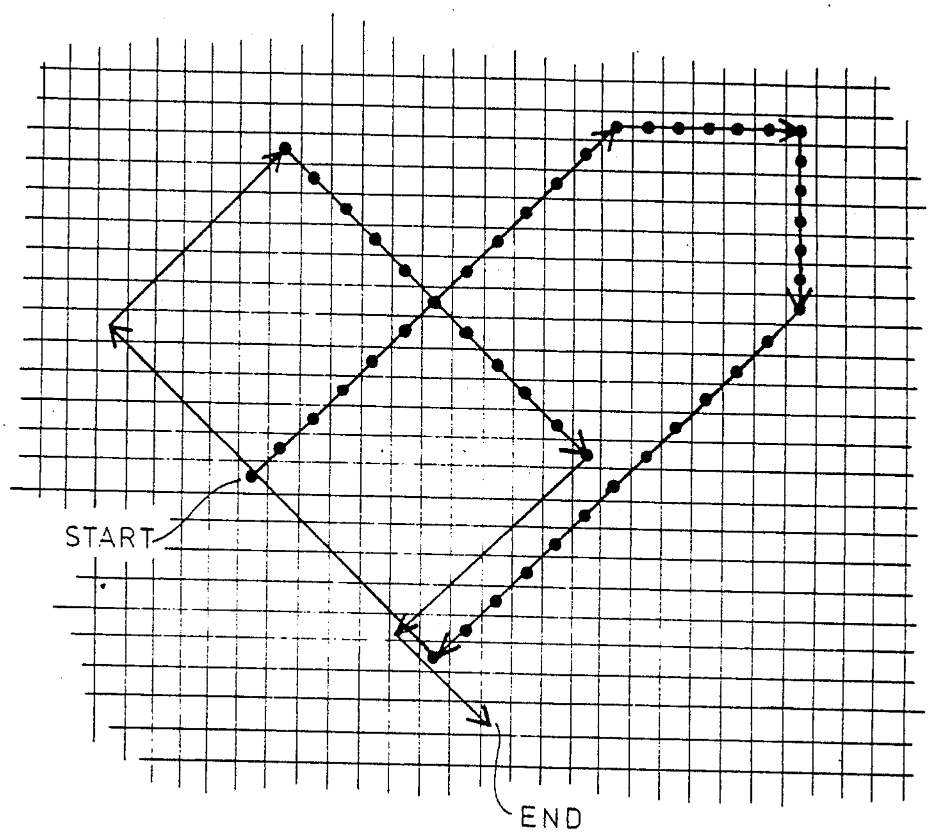
FIG. 3 illustrates the "A" of FIG. 1 rotated through 315° without compensation for distortion.

However, as noted in the introduction, rotation through 45° or an odd multiple thereof will produce distortion in the displayed characters due to the relative change in the displayed lengths of the axial and diagonal strokes. This is shown in FIG. 3 for the capital "A" of FIG. 1, where it is assumed that the character is rotated through 315° by the addition modulo 8 of 111 to each of the direction codes of FIG. 2.

Figure 4:
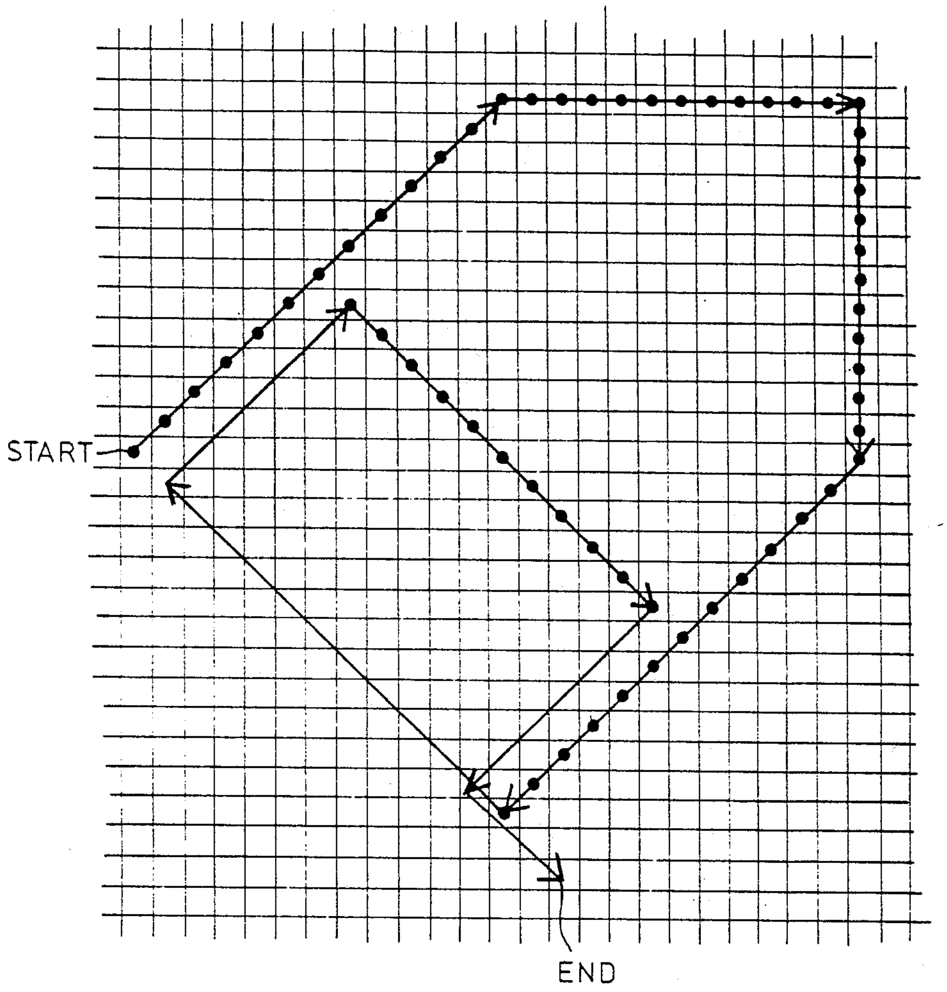
FIG. 4 illustrates the "A" of FIG. 1 rotated through 315° with compensation for distortion.

This distortion can be simply removed, however, by doubling the number of matrix steps defined by the length code in respect of all strokes which lie in a diagonal direction in the unrotated character. This is shown in FIG. 4, where the initially diagonal strokes (the second and third—see FIG. 2) are doubled in length from 6 to 12 matrix steps. The result is a character whose original proportions are perfectly preserved but which is $\sqrt{2}$ larger.

In general, since diagonal strokes in the unrotated character have a direction code whose least significant bit is 1, and since the character rotation factor corresponding to 45° or an odd multiple thereof also has a least significant bit of 1, the condition for doubling the number of matrix steps in respect of any given stroke is determined by ANDing the least significant bits of the direction code and the rotation factor and examining the result for a 1. Doubling the number of matrix steps is then effected simply by doubling the length code of the stroke, i.e., shift left one bit position.

It is to be noted that character proportions can alternatively be preserved by halving the number of matrix steps in respect of strokes which initially lie in an axial direction, i.e., shift the length code right by one bit position. However, in this case precision is lost unless the length code of every axial stroke defines an even number of steps (least significant bit of length code is 0). The resulting character will be $1/\sqrt{2}$ smaller.

A method of generating characters coded and stored as above in a raster graphics display system will now be described with reference to FIGS. 5 and 6.

Figure 5:
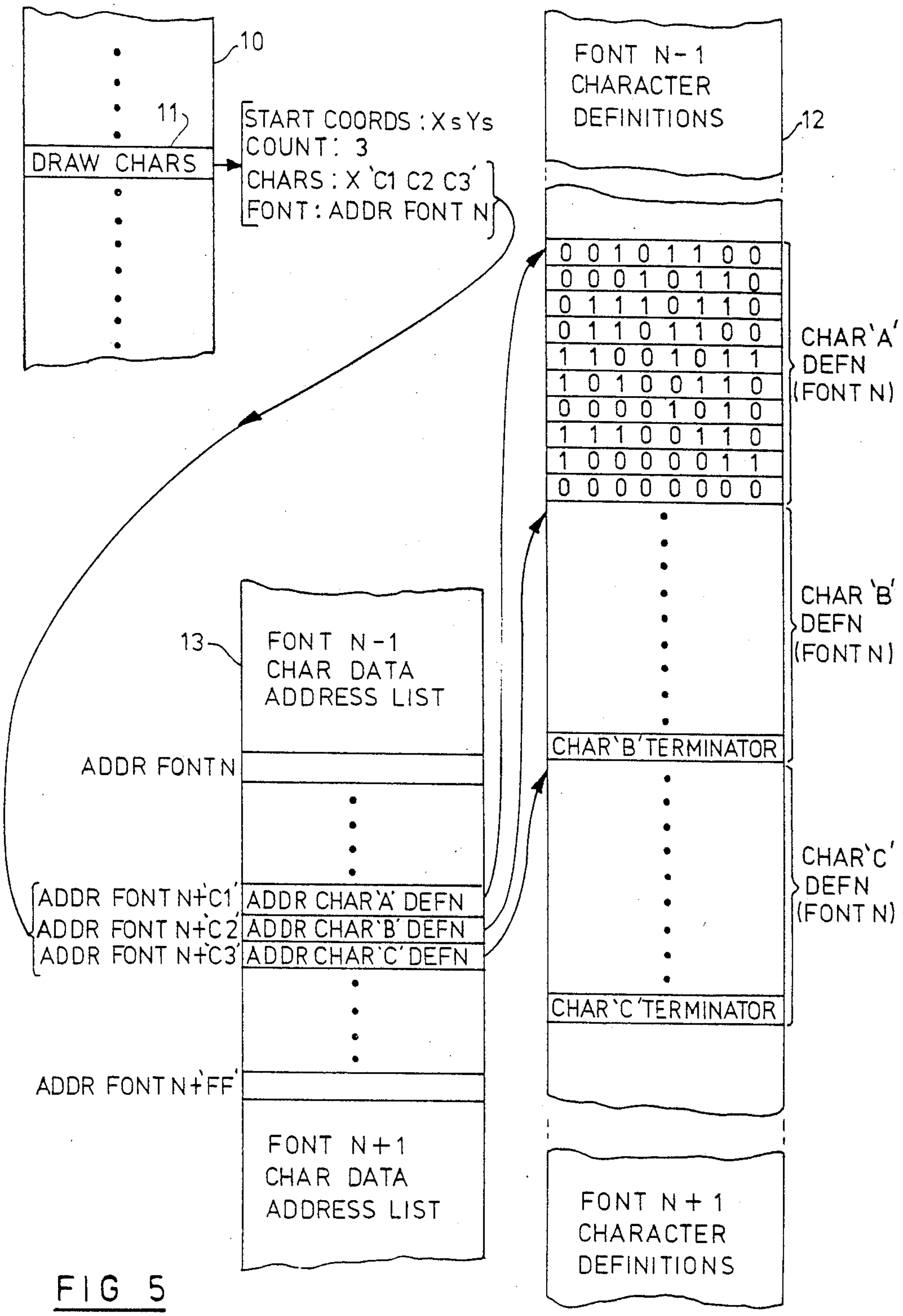
FIG. 5 shows how the coded characters can be stored and accessed in a raster graphics system.

Referring first to FIG. 5, the graphics system includes a display list buffer 10 containing a computer-produced display list comprising a sequence of commands for execution by a display processor (not shown) in conventional manner. The commands will generally include point and line drawing commands, as well as character string drawing commands such as that shown at 11. The DRAW CHARACTERS command typically contains the following information:

START COORDS: Display device coordinates $X_sY_s$ for the first character in string.
COUNT: Number of characters in string.
CHARS: Identity of characters to be displayed.
FONT: Identity of font (if more than one).

In the present case, the DRAW CHARACTERS command will also contain the character rotation factor.

In this embodiment of the invention the characters are assumed to be available in several fonts, the coded character definitions for each font being stored in a font character data (FCD) table 12. Within each character definition in the FCD table 12 consecutive bytes represent the consecutive coded strokes of the character in the manner of FIG. 2.

Since the number of strokes defining a character will usually differ according to the font style, and thus the definitions for the same character will differ in length from one font to another, the character definitions in the FCD table 12 are not accessed directly but via a font index (FI) table 13. The FI table contains, for each font, the addresses in the FCD table 12 of each character definition in that font, the addresses of the character definitions in the FI table 13 being listed in the same order for each font.

In these circumstances, any character in any font can be uniquely specified in the DRAW CHARACTERS command by a font address defining the start of the character address list for that font in the FI table 13, together with an offset which is the distance down the FI table 13 to the address of the desired character relative to the start of the font list. Thus, in FIG. 5, it is assumed that font N is chosen by the DRAW CHARACTERS command by specifying ADDR FONT N which is the start of the character address list in the FI table 13 for font N, and that the selected character string is ABC whose individual offset addresses in the FI table 13 are hexadecimal C1, C2 and C3 respectively. The addresses present as data in the storage locations pointed to by (ADDR FONT N+C1), (ADDR FONT N+C2) and (ADDR FONT N+C3) point in turn to the first coded stroke of the respective character definitions in the FCD table 12. In the present example each font contains 256 entries in the FI table 13 (FONT ADDR N to FONT ADDR N+FF) so that an alphanumeric and symbol set of up to 256 characters can be accommodated in each font.

Figure 6:
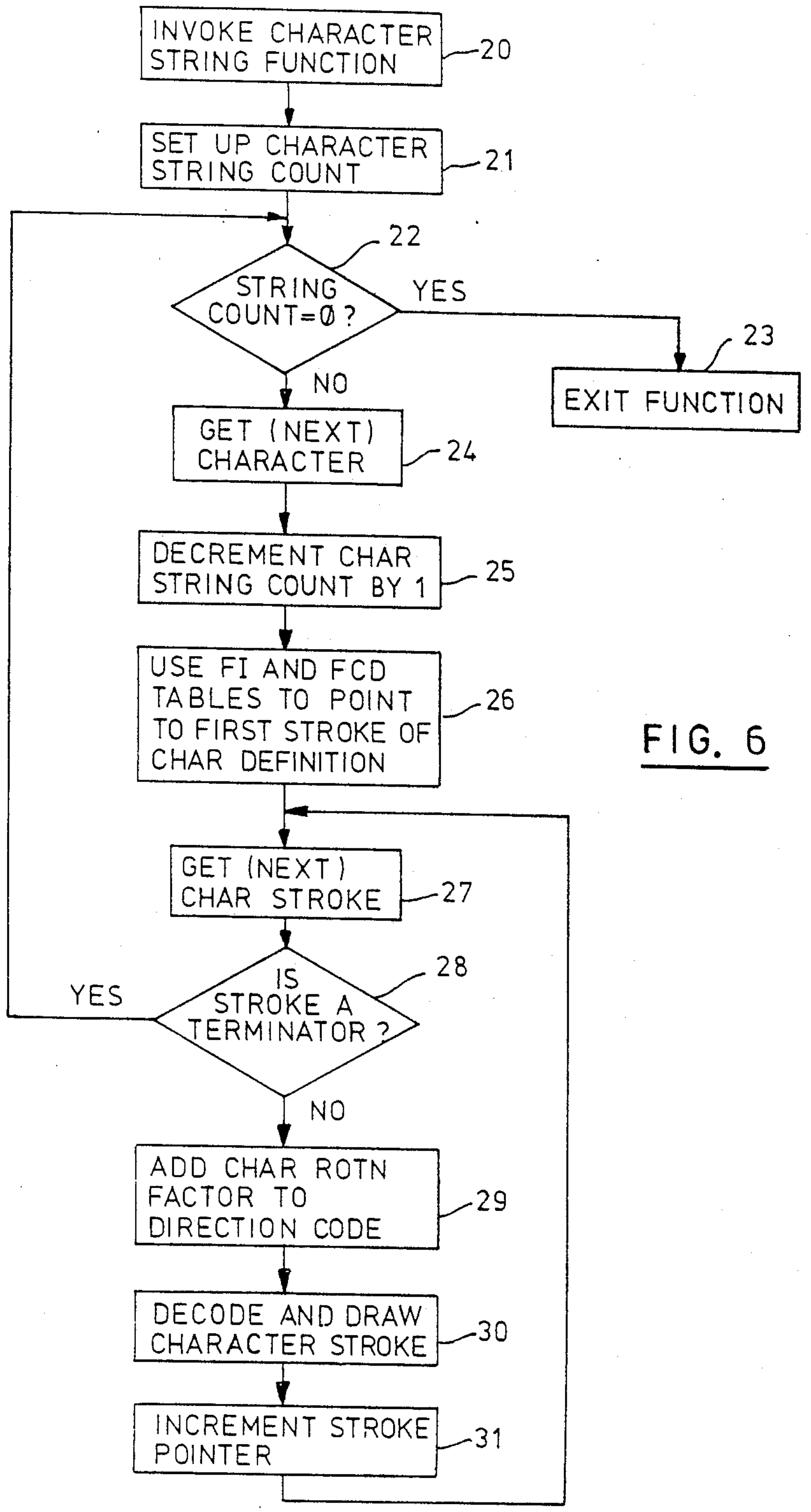
FIG. 6 is a flow diagram of a method of generating characters for display from a set of characters stored as in FIG. 5.

Referring not to FIG. 6, the character string function is invoked, step 20, by the display processor in response to a DRAW CHARACTER command. A character string count is set up, step 21, using the value COUNT in the DRAW CHARACTER command, and the count is tested for zero. For the first character the result will be NO so the system is directed to obtain the first character, step 24, and the character string count is decremented by 1, step 25. The FI and FCD tables are now used to point to the first stroke of the character definition, step 26, and the stroke is read out of the FCD table, step 27. The stroke is examined for being a terminator, step 28. The result will be NO for the first stroke so the character rotation factor, if any, is added to the stroke direction code, step 29.

The decode and draw step 30 transforms the 8-bit coded stroke information into a form usable by a conventional point plotting mechanism which, beginning at the start position for the first stroke of a character and at the final pel position of the previous stroke for the second and subsequent strokes, first plots or does not plot a visible point at the current pel position as determined by the draw/move code and then generates the address of the next adjacent pel position in the direction defined by the direction code, this being repeated for the number of matrix steps defined by the length code. Since the decision to plot/not plot for each matrix step is determined at the current pel position prior to the generation of the next pel position address, the decision to plot/not plot for the first pel position of a move stroke which follows a draw stroke is determined by the draw/move code of the previous draw stroke rather than that of the current move stroke. This ensures that the full visible length of the draw stroke is displayed, since otherwise the visibility of the pel at the final pel position of a draw stroke, being also the first pel position of the move stroke, would be determined by the draw/move code of the move stroke, i.e., it would not be visible.

As mentioned previously the START COORDINATES $X_sY_s$ define the location of the start position of the first character on the display device.

Next, the stroke pointer is incremented by 1, step 31, and steps 27 to 31 are repeated for each stroke in the character definition. The cycle is terminated by the detection of a terminator at step. 28, whereupon the sequence from step 22 is repeated for each character in the string. The character string function is finally terminated by the exit function, step 23, which is invoked when the character string count becomes zero.

Figure 7:
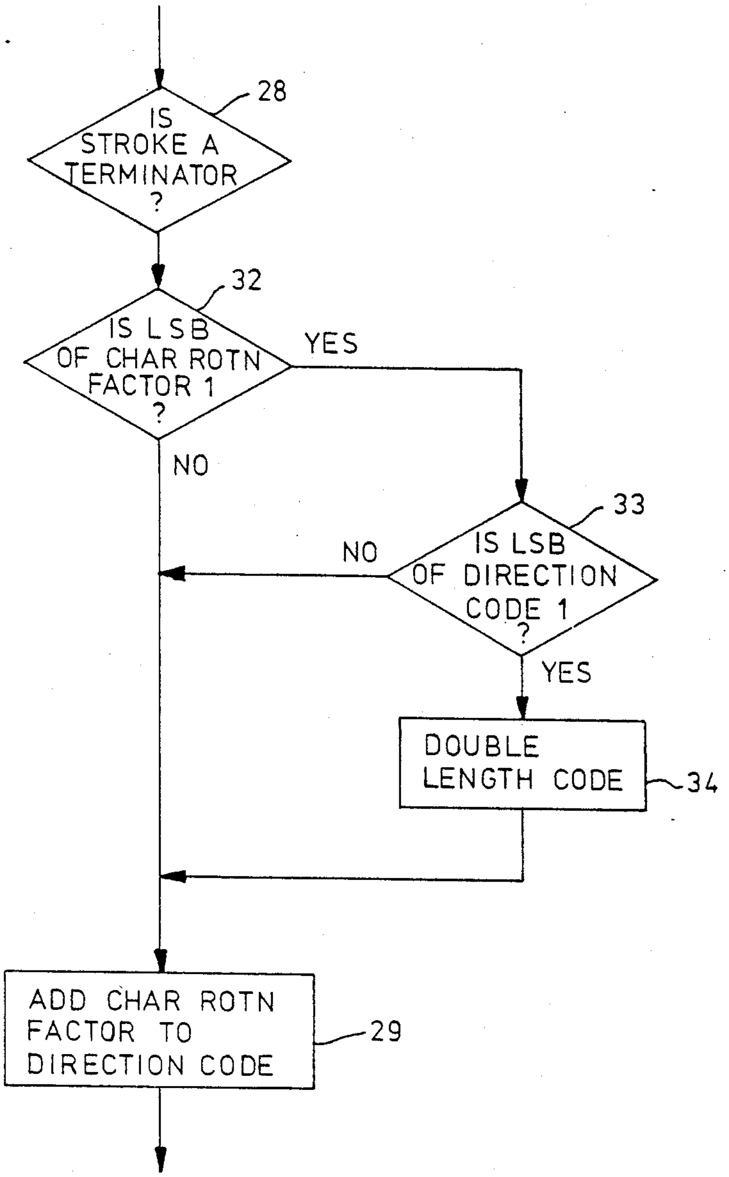
FIG. 7 is a modification of FIG. 6 for handling rotation of characters through 45° or an odd multiple thereof.

FIG. 6 assumes that only rotation through 90° or a multiple thereof is required, and therefore no compensation for character distortion is included. FIG. 7 shows the additional steps which can be used when rotation through 45° or a multiple thereof is required. Thus, between steps 28 and 29 of FIG. 6, the least significant bits of both the character rotation factor and the direction code are tested for being a 1, steps 32 and 33, and if both tests are positive, the length code is doubled at step 34.

It should be recognised that, having selected a particular sequence of directions for tracing round a character, the length code of each visible stroke is not necessarily equal to the actual number of matrix steps between the visible endpoints of the stroke as in the embodiment shown in FIGS. 1 and 2, but is dependent upon the characteristics of the point plotting mechanism.

Figures 8, 9:
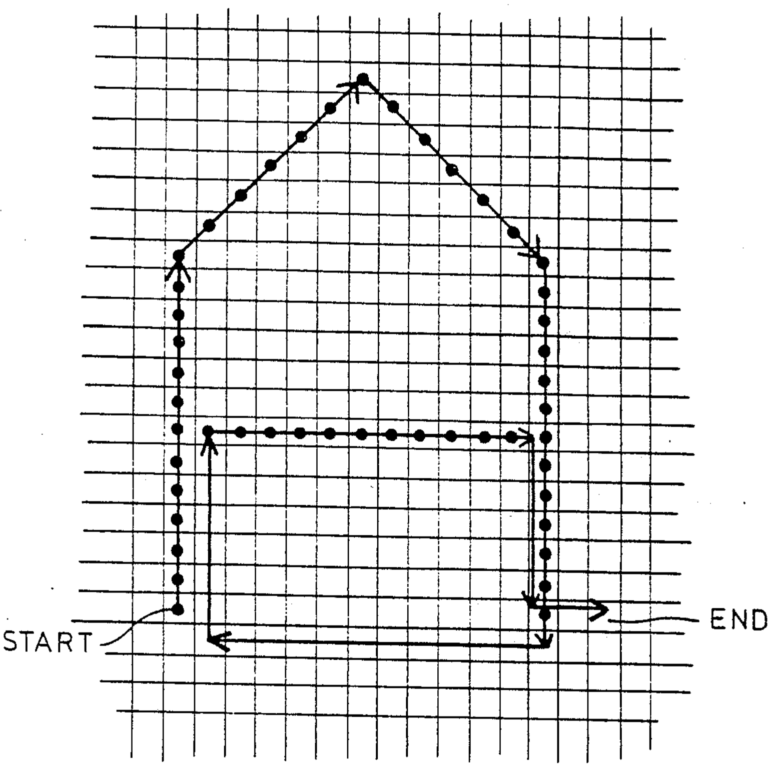
FIGS. 8 and 9 illustrate an alternative method of coding the "A" of FIGS. 1 and 2.

For example, if we assume that in the plotting mechanism described above, the visibility of the first pel position of a move stroke which follows a draw stroke is determined by the draw/move code of the move stroke rather than that of the previous draw stroke, one would need to overspecify by one step the length of any draw stroke which is followed by a move stroke. Thus, for the capital "A" shown in FIG. 1, the path traced out by the strokes would need to be shown in FIG. 8 with a resultant coding as shown in FIG. 9. It will be observed that in FIGS. 8 and 9 the fourth and seventh (draw) strokes are one step longer than their counterparts in FIGS. 1 and 2, with consequent adjustment in the length of the sixth and ninth (move) strokes.

In such a case compensation for distortion caused by rotation through 45° or an odd multiple thereof can still be achieved by doubling the length code of initially diagonal strokes, provided that the character is designed and coded in such manner that in the unrotated character definition no diagonal draw stroke is followed by a move stroke, i.e., the length code for the diagonal stroke in fact equals the actual number of steps between the endpoints of the line. This is true of the "A" shown in FIG. 8, and the condition can be satisfied for any other character by appropriate character design and coding (stroke) direction.

Although the above embodiment illustrates the storage method applied to a raster display system, it is also applicable to a vector or calligraphic system. Thus, by suitable decoding, the coded character strokes can be converted to the endpoints of visible and invisible lines and used to directly drive the pen of a plotter or the electron beam of a random scan CRT.

We claim:

1. A method of storing characters in a display system having a display device with an orthogonal matrix of addressable points and drawing said stored characters on said display device, comprising the steps of:
   - representing each character as a succession of strokes each constrained to lie in one of eight fundamental directions of the matrix, and, except for a first stroke, each starting at an end of a previous stroke;
   - storing each such stroke in a binary coded form which includes a first binary number defining an angular direction of said stroke, a second binary number defining a number of matrix steps from one point to a next point along said stroke, and a third binary number defining a visibility characteristic of said stroke;
   - storing a character rotation code;
   - storing a binary representation of a terminator code to indicate that a current character has been completed;
   - testing a predetermined binary bit of said character rotation code for an odd integer multiple of forty-five degrees;
   - increasing said second binary number defining a number of matrix steps in a stroke by an integer multiple thereof if said testing step determines an odd integer multiple of forty-five degrees in said character rotation code.

2. A method of storing characters in a display system having a display device with an orthogonal matrix of addressable points and drawing said stored characters on said display device, comprising the storing steps of: representing each character as a succession of strokes each constrained to lie in one of eight fundamental directions of the matrix, and, except for a first stroke, each starting at an end of a previous stroke;
   - storing each such stroke in a binary coded form which includes a first binary number defining an angular direction of said stroke, a second binary number defining a number of matrix steps from one point to a next point along said stroke, and a third binary number defining a visibility characteristic of said stoke;

storing a binary representation of a terminator code to indicate that a current character has been completed; and storing a representation of a character string count; and further comprising the drawing steps of:

accessing a character to be drawn;

determining a location in storage for a first stroke of said character to be drawn; and further comprising the additional drawing steps of:

determining whether a binary code representing said stroke is a terminator code;

accessing a next character if said code is a terminator code;

determining whether a character rotation code is to be added to a direction code for said stroke;

if a character rotation code is to be added testing a predetermined binary bit of said character rotation code for an odd integer multiple of 45 degrees;

doubling said second binary number defining a number of matrix steps in a stroke if said testing step determines an odd integer multiple of 45 degrees in said character rotation code, drawing said stroke on a display device; and determining a location in storage for a next stroke of said character to be drawn and repeating said additional drawing steps until all strokes of said character have been drawn and repeating said drawing steps until all characters have been drawn.

* * * * *